(12) United States Patent
Abe

(10) Patent No.: US 6,532,124 B1
(45) Date of Patent: Mar. 11, 2003

(54) INFORMATION RECORDING APPARATUS AND METHOD THEREOF

(75) Inventor: Takafumi Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/484,351

(22) Filed: Jan. 18, 2000

(30) Foreign Application Priority Data

Jan. 18, 1999 (JP) .......................................... 11-009027

(51) Int. Cl.$^7$ ................................................. G11B 5/09
(52) U.S. Cl. ....................................................... 360/48
(58) Field of Search .................................... 360/48, 69

(56) References Cited

U.S. PATENT DOCUMENTS 5,367,410 A * 11/1994 McCarthy ..................... 360/22
5,566,032 A * 10/1996 Cleveland et al. ......... 360/72.2

* cited by examiner

Primary Examiner—Regina N. Holder

(74) Attorney, Agent, or Firm—Frommer Lawrence & Haug LLP; William S. Frommer; Glenn F. Savit

(57) ABSTRACT

The present invention relates to an information recording apparatus and a method thereof that allow all data on a magnetic tape to be easily obtained and instrumental data and header information supplied from respective systems to be combined when instrumental data is recorded. According to the present invention, an additional information area is formed at the top of the magnetic tape. The additional information area is followed by a data area. Instrumental data is stored in a buffer memory through a data connector. The header information is stored in a local memory through a header information control connector in addition to a control command. Instrumental data is swept out from the buffer memory and recorded to a data area of the magnetic tape. After the instrumental data is recorded, header information is read from the local memory and stored in the buffer memory. The header information is swept out from the buffer memory and recorded to the additional information area of the magnetic tape. When data is read from the additional information area, all contents of the magnetic tape are obtained. Since header information is temporarily stored to the local memory and then recorded, a processing portion that combines header information and instrumental data can be omitted.

13 Claims, 12 Drawing Sheets

INFORMATION RECORDING APPARATUS AND METHOD THEREOF

BACKGROUND OF THE INVENTION

1. Field of the Invention

The present invention relates to an information recording apparatus and a method thereof suitable for recording instrumental so that a series of data is successively supplied, for example, measured data.

2. Description of the Related Art

A driving device having a detachable cassette tape on which digital data is recorded is connected to a host computer through an interface and is used as an external storing device of a magnetic tape recording/reproducing apparatus (hereinafter, referred to as data recorder). As an example of the data recorder, a helical scan type recorder of which digital data is recorded to a cassette tape with a rotating head is known. Such a data recorder is connected to a host computer through an interface unit corresponding to for example SCSI (Small Computer System Interface) standard.

In addition to conventional data exchanged with a computer, such a data recorder handles instrumental data that is obtained by observing and instrumentation devices. Examples of instrumental data are data transmitted from a satellite and distortion data measured at a tunnel with an ultrasonic wave. In devices connected to respective data recorders disposed at several positions, vibrations of an explosion at a particular position are measured by the instrumental devices. Thus, a plurality of sequences of data are obtained. Such data is referred to as instrumental data. The data contains a large amount of noise. Thus, any parts of the data are discarded. In addition, the data is sequentially supplied to each data recorder.

FIG. 1 is a block diagram showing an example of the structure of a recording/reproducing system using a data recorder that records and/or reproduces instrumental data. In this example, data is received from a satellite and recorded to the data recorder. A radio wave transmitted from a satellite is received by an antenna 100. The received signal is supplied to a receiving system 101 and converted into digital data. The received data, which is instrumental data, is supplied from the receiving system 101 to a recording system 102. The recording system 102 adds particular additional information to the received data. The resultant data is supplied to a data recorder 103 and then recorded on a record tape 104.

When data is reproduced, the record tape 104 is attached to a data recorder 103. Instrumental data reproduced by the data recorder 103' is supplied to a processing system 105. The data recorder 103' may be the same as the data recorder 103 that is used for recording data. The processing system 105 converts the reproduced instrumental data in a predetermined format. The formatted data is stored as measured data to a storing system 106 that is for example a hard disk. The stored data is analyzed by for example a computer.

FIG. 2 is a block diagram showing an example of the structure of the recording system 102 and the data recorder 103 according to a related art reference. The received data supplied from the receiving system 101 to the recording system 102 is temporarily stored to a data buffer 110. A CPU 111 generates additional information corresponding to the instrumental data, controls the data buffer 110, controls the recording system 102, and generates a control command for the data recorder 103 (that will be described later).

After a predetermined amount of data is stored in the data buffer 110, data is swept out and supplied to an adding device 112. Likewise, the additional information is supplied from the CPU 111 to the adding device 112. The adding device 112 functions as a switching mechanism for selecting instrumental data received from the data buffer 110 or additional information received from the CPU 111 and outputs the instrumental data and the additional data with one line. The adding device 112 outputs the instrumental data and the header information as record data. The record data is output from a data connector 113 of the recording system 102 and supplies the record data to a data connector of the data receiver 103.

On the other hand, the CPU 111 generates a command for controlling the data recorder 103 and outputs the command from a command connector 114. This command is supplied to a relevant connector (command connector) of the data recorder 103. The data recorder 103 records the record data of which the instrumental data and the additional information have been combined to the record tape 104.

FIG. 3 is a schematic diagram showing an example of a record format in which instrumental data is recorded to the record tape 104. At the beginning of the tape 104, a lead area is formed for a predetermined length. Instrumental data starts from a point A that is the end of the lead area. The instrumental data is successively recorded to the record tape 104 until the data recorder 103 receives a stop command. The rest of the record tape 104 after the end of the instrumental data (this area is referred to as point B) is an unused area.

FIG. 4 is a flow chart showing an example of the process of the data recorder 103 that records instrumental data according to the related art reference. When the record tape 104 is attached to the data recorder 103 (at step S100), the tape 104 is moved to a write point (a point A shown in FIG. 3) (at step S101). When data is written to the tape 104 on which data has been written, the tape 104 is moved to the point B shown in FIG. 3.

When the data recorder 103 receives data, the data recorder 103 records the data from the write point (at step S102). After the recorder 103 has recorded the data to the tape 104 (at step S103), the tape 104 is moved to a header information write point. The tape 104 is manually moved by the user. For example, the header information write point is set adjacent to the data write end point. At step S105, the header information is written after the header information write point.

After the header information has been written to the tape 104, if there is next data (at step S107), the flow returns to step S101. At step S101, the tape 104 is manually moved. Thereafter, the next data and header information thereof are written to the tape 104. In such a manner, instrumental data and header information are paired. After data has been measured and all data has been written, the tape 104 is rewound to the top thereof (at step S108). Thereafter, the tape 104 is detached (at step S109).

FIG. 5 is a schematic diagram showing the format of the tape 104 in which instrumental data and additional information have been recorded in the above-described manner. Conventionally, pairs of additional information (header information) and instrumental data are successively recorded on the tape 104.

Header information is for example time information and position information corresponding to measured data. Thus, the header information varies time by time. For example, when data is received from a satellite, the data is measured when the satellite comes to a receivable range. After data is recorded for a predetermined time period (for example 10 minutes), the satellite leaves the receivable range. Thus, the measuring operation and the recording operation are stopped. Thereafter, header information of measured date and time is recorded. When the satellite comes to the receivable range next day, data is measured and recorded. Header information corresponding to the data is recorded in the same manner. The data write point and the header information write point of each session (for example, tape position information) should be recorded in a proper means like memo.

FIG. 6 is a flow chart showing an example of the process of the data recorder 103' (or 103) that reproduces the above-described data from the record tape 104. When the record tape 104 is attached to the data recorder 103' (at step S200), the tape 104 is moved to the header information read-out point (at step S201). The data recorder 103' reads header information from the header information read-out point of the tape 104 (at step S202). The tape 104 is manually moved by the user with reference to the tape position information of the header write point that has been recorded.

After the data recorder 103' has read the header information (at step S203), the tape 104 is moved to the data read-out point (at step S204). The data recorder 103' reads the header information from the data read-out point of the tape 104 (at step S205). Since the header information does not contain the tape position information of the data read-out point, the tape 104 is manually moved by the user with reference to the tape position information of the data write point that has been recorded.

After the data has been read (at step S206), when the next data is read (at step S207), the flow returns to step S201. At step S201, the tape is manually moved. The data recorder 103 reads the next header information and the next data from the tape 104. After desired data has been read, the tape 104 is rewound to the beginning thereof (at step S208) and the tape 104 is detached (at step S209).

Conventionally, as described above, to process data recorded on the record tape 104, data recorded on the record tape 104 should be read from the top thereof to the end thereof with the same system as the writing system so as to format header information and index information. In other words, in the conventional recording method, pairs of instrumental data and header information are repeated in the order of the measurement. Thus, unless data is read from the top of the tape 104 to the end thereof, all the data on the tape 104 cannot be obtained.

In addition, in the related art reference, as described above, when instrumental data is recorded by the data recorder 103, the received data that is output from the recording system 102 is input by the data connector. On the other hand, the control command for controlling the data recorder 103 is input by the command connector. Although data is read from the data buffer, header information and a control command are generated and output by the CPU 111.

To write instrumental data and header information that represents the contents of the tape 104 to the tape 104, the recording system 102 should have a switching mechanism (the adding device 112 shown in FIG. 10) that selects output data of the data buffer 110 or a control command received from the CPU 111 so as to supply the header information and data to the data connector of the data recorder 103 (with one line).

OBJECTS AND SUMMARY OF THE INVENTION

Therefore, an object of the present invention is to provide an information recording apparatus and a method thereof that allow all data of instrumental data recorded on a tape to be obtained.

Another object of the present invention is to provide an information recording apparatus and a method thereof that allow both data that is output from a data buffer and header information that is output from a CPU to be recorded on a tape without need to use a switching mechanism.

A first aspect of the present invention is an information recording apparatus for recording a sequence of user data composed of a digital signal to a tape shaped record medium, comprising a boundary setting means for setting the boundary of a first area and a second area to the tape shaped record medium, the first area being used to record the user data, the second area being used to record header information containing at least the position information that represents the top of the user data, a first memory means for successively storing the user data in the order of which the user data is received, a second memory means for storing the header information formed corresponding to the user data, a recording means for reading the user data from the first memory means corresponding to a control signal, recording the user data to the first area, reading the header information from the second memory means, and recoding the header leader data to the second area in the order of which the user data is recorded to the first area, and a controlling means for generating the control signal.

The controlling means controls the recording means so as to record the position information of the boundary of the first area and the second area to the top portion of the second area.

The controlling means controls the recording means so as to read the header information from the second memory means, temporarily write the header information to the first memory means, read the header information from the first memory means, and record the header information to the second area.

The controlling means records the user data to the first area and then the header information to the second area.

The header information further contains time information of the user data.

The header information further contains identification information of the user data.

The position information is address information that represents the position in the longitudinal direction of the tape shaped record medium.

The user data is composed of instrumental data that is measured or observed in a time sequence.

A second aspect of the present invention is an information recording method for recording a sequence of user data composed of a digital signal to a tape shaped record medium, comprising the steps of (a) setting the boundary of a first area and a second area to the tape shaped record medium, the first area being used to record the user data, the second area being used to record header information containing at least the position information that represents the top of the user data, (b) successively storing the user data in the order of which the user data is received, (c) storing the header information formed corresponding to the user data, (d) reading the user data obtained at step (b) corresponding to a control signal, recording the user data to the first area, reading the header information obtained at step (c), and recoding the user data to the second area in the order of which the user data is recorded to the first area, and (e) generating the control signal.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1:
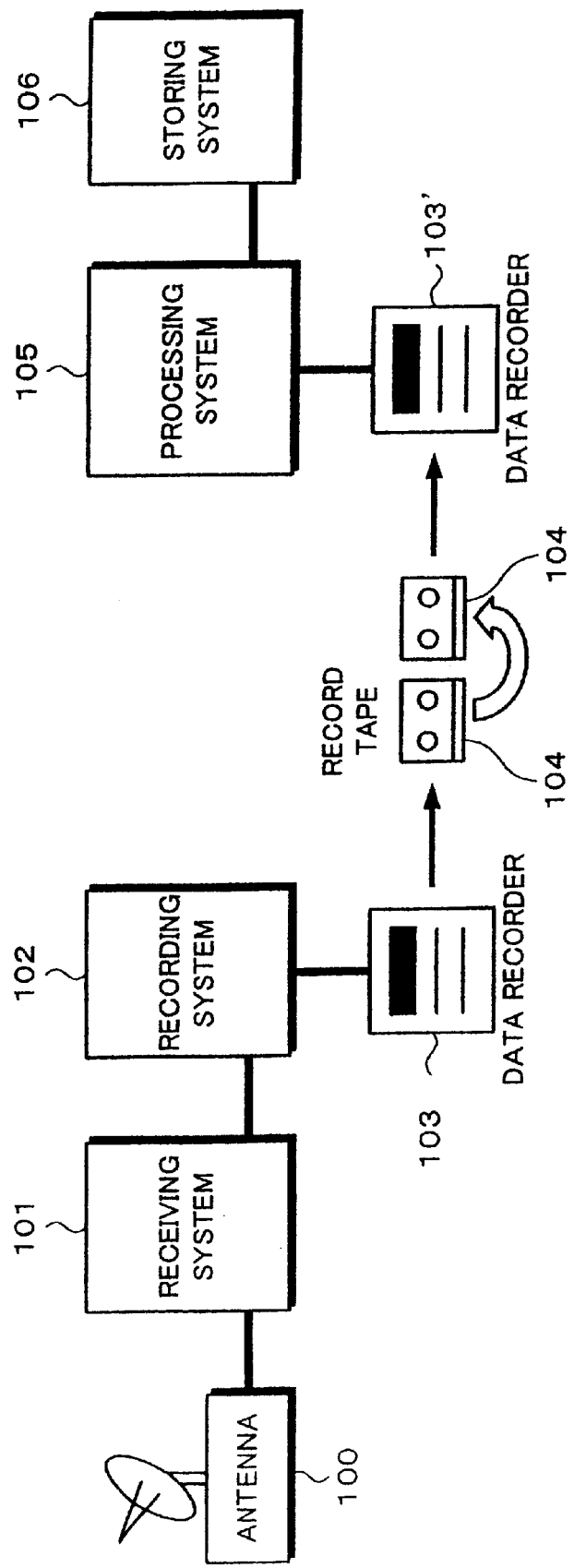
FIG. 1 is a block diagram showing an example of the structure of a recording/reproducing system using a data recorder that records and/or reproduces instrumental data according to a related art reference.
Figure 2:
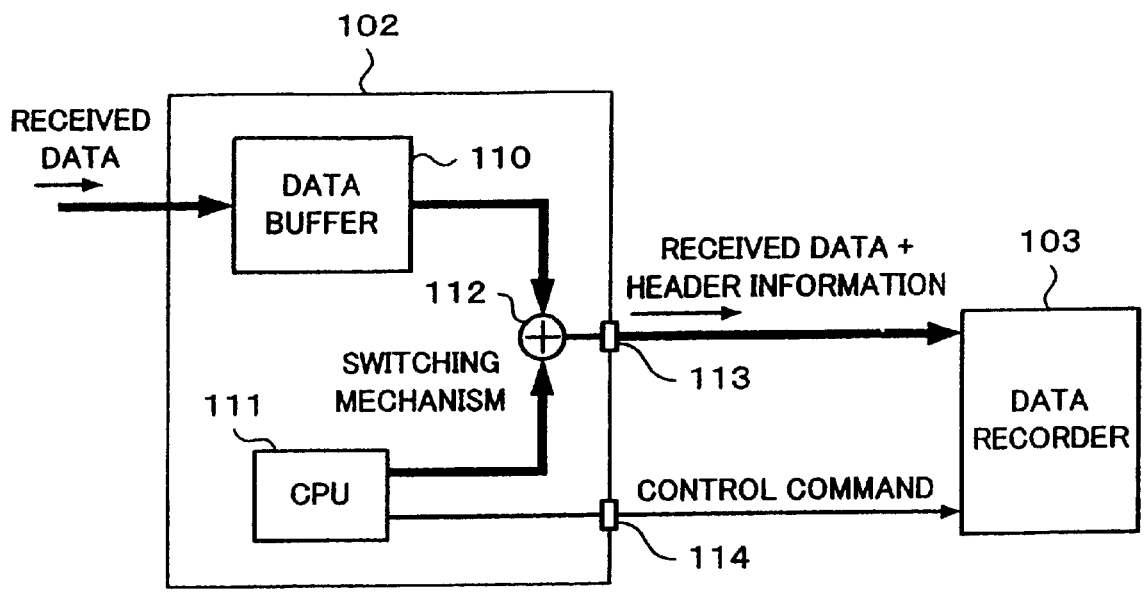
FIG. 2 is a block diagram showing an example of the structure of a recording system and a data recorder according to the related art reference.
Figure 3:
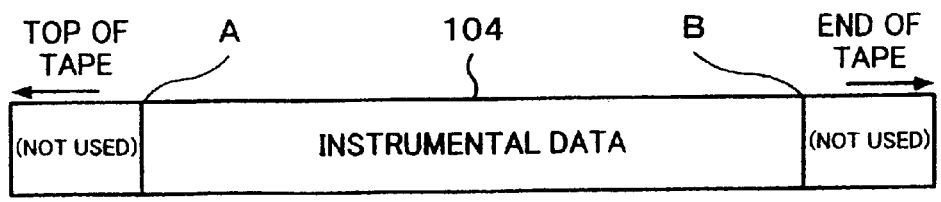
FIG. 3 is a schematic diagram showing an example of the record format in which instrumental data is recorded to a record tape according to the related art reference.
Figure 4:
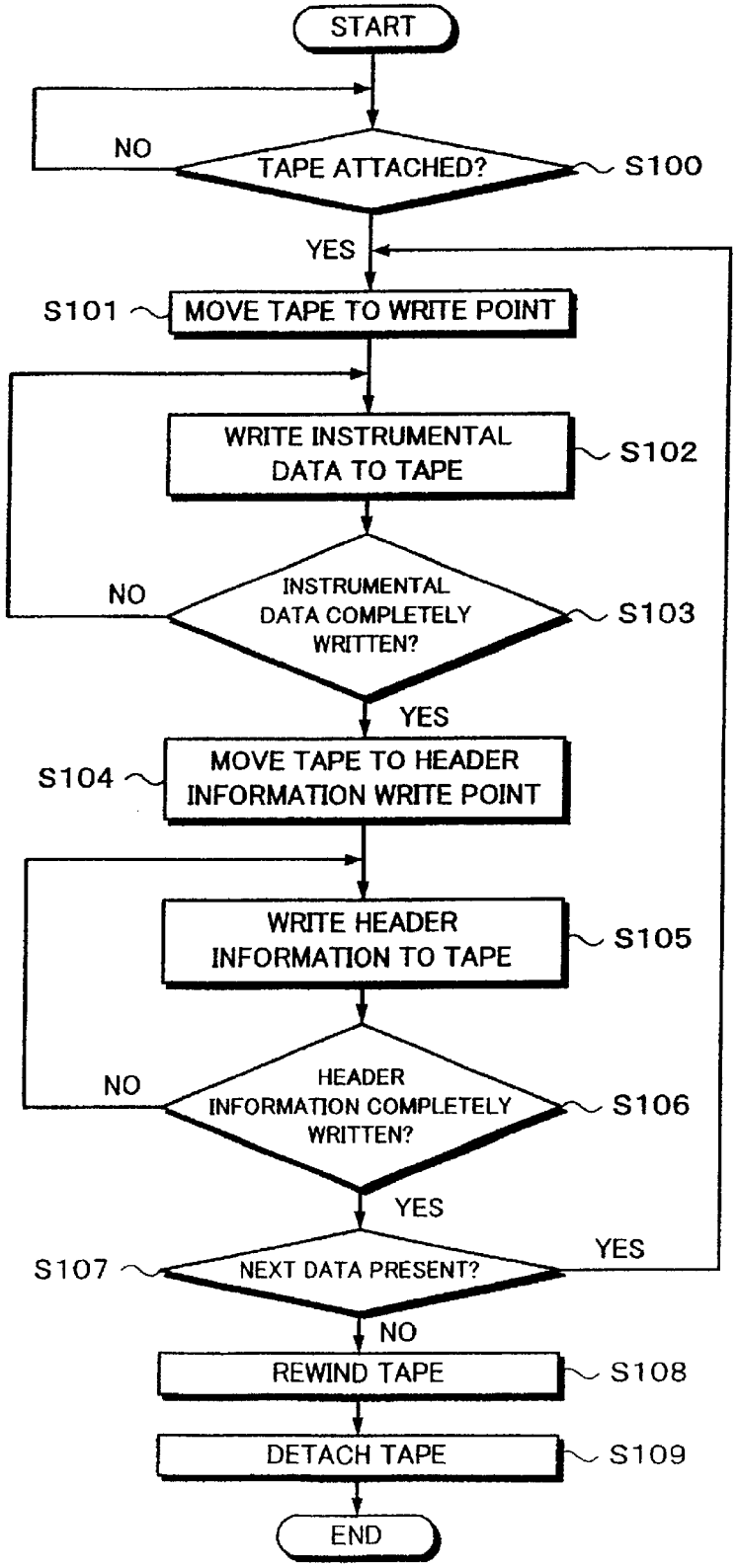
FIG. 4 is a flow chart showing an example of the process of the data recorder that records instrumental data according to the related art reference.
Figure 5:
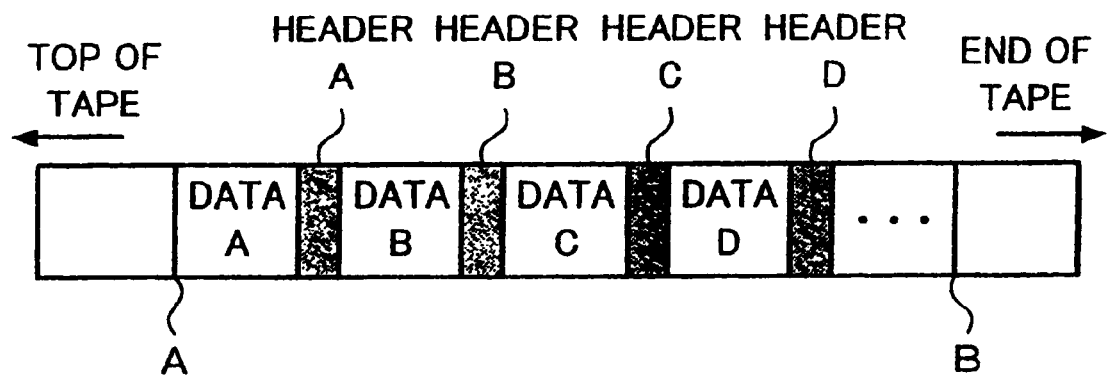
FIG. 5 is a schematic diagram showing the format of the tape in which data has been recorded according to the related art reference.
Figure 6:
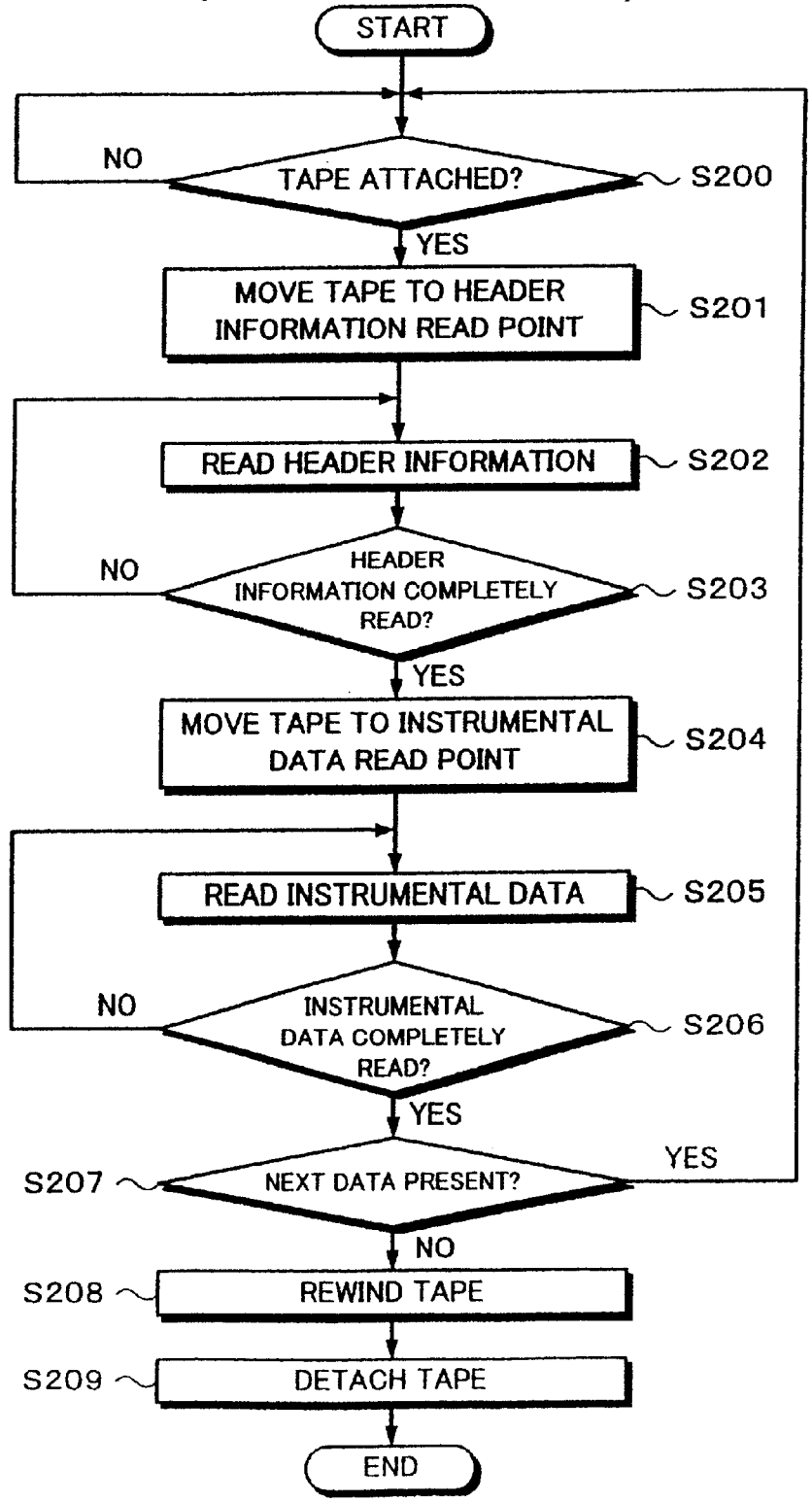
FIG. 6 is a flow chart showing an example of the process of the data recorder that records instrumental data according to the related art reference.
Figure 7:
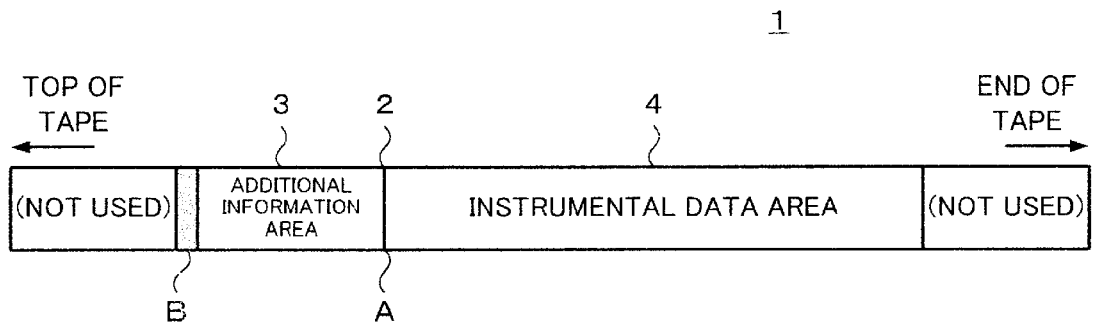
FIG. 7 is a schematic diagram showing the format of a format of a magnetic tape 1 according to the present invention.

Next, with reference to the accompanying drawings, an embodiment of the present invention will be described. According to the present invention, a boundary is set at a predetermined position of a magnetic tape on which data is recorded. FIG. 7 is a schematic diagram showing the format of the magnetic tape 1 according to the present invention. A lead area is formed at the top of the magnetic tape 1 for a predetermined length. In the following description, unless otherwise specified, the lead area is not considered. A boundary 2 is set at a position A of the magnetic tape 1. An area from the boundary 2 to the end of the magnetic tape 1 is a record area for instrumental data (this record area is referred to as instrumental data area 4). An area from the top of the magnetic tape to the boundary 2 is an additional information area 3. An area preceded by the instrumental data area 4 is an unused area.

As will be described later, the position A that represents the boundary 2 can be set at any position by the user. Position information that represents the position A of the boundary 2 is recorded at an area B at the top of the additional information area 3. The additional information area 3 is prohibited from being written with the instrumental data. The user can write data different from instrumental data in the instrumental data area 4 to the additional information area 3. For example, the user can write header information of instrumental data and index information of data recorded on the magnetic tape 1 to the additional information area 3.

The data is recorded as helical tracks on the magnetic tape 1. Address data that represents the position on the tape 1 is recorded in the longitudinal direction thereof. The address data is for example a time code that is time information corresponding to the running of the tape 1. Alternatively, the address data may be sequence numbers recorded in the longitudinal direction at predetermined intervals. As address information, the absolute positions of the tape 1 may be used. As address information, a track ID for each helical track or a track set ID for a set of a plurality of helical tracks may be used.

Figure 8:
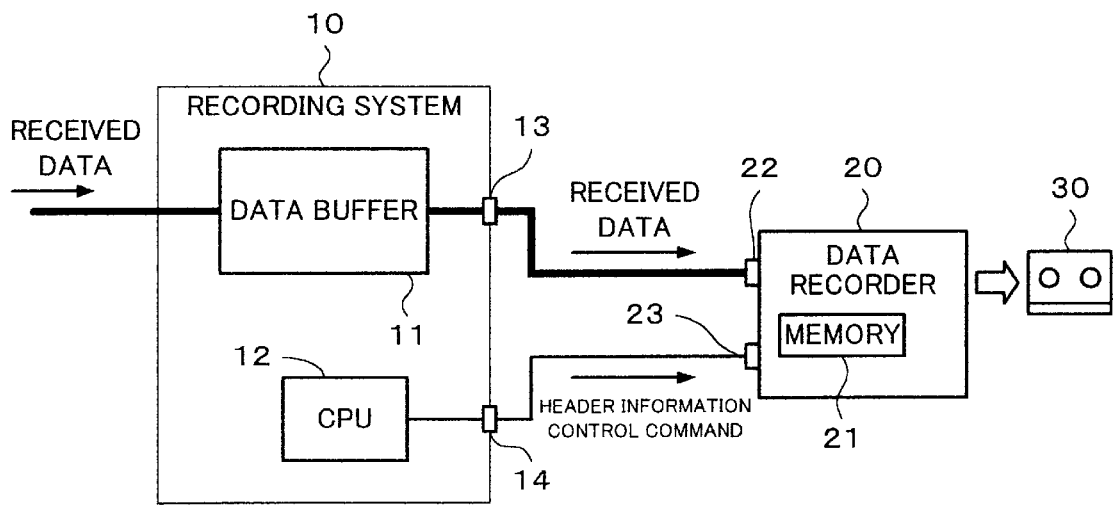
FIG. 8 is a block diagram showing an example of the structure of a recording system and a data recorder according to an embodiment of the present invention.

FIG. 8 is a block diagram showing the structure of a recording system and a data recorder according to the embodiment of the present invention. The recording system 10 has a data buffer 11 and a CPU 12. The CPU controls the data buffer 11, generates header information, and generates a control command for the data recorder 2 (that will be described later). The received data (instrumental data) is temporarily stored in the data buffer 11 under the control of the CPU 12.

The recording system 10 comprises a receiver or an instrumentation device and a computer. The receiver receives data. The instrumental device measures a particular target. The computer controls the receiver or the instrumentation device. Data is received or measured automatically or manually corresponding to a predetermined program installed in the computer. As will be described later, the data recorder 20 connected to the recording system 10 can be controlled by the computer of the recording system. The data recorder 20 can be controlled manually or corresponding to a particular program.

The recording system 10 has a data connector 13 and a header information control connector 14. The data connector 13 outputs data that is read from the data buffer 11. The header information control connector 14 outputs a command and header information generated by the CPU 12. Likewise, corresponding to the connectors 13 and 14, the data recorder 20 has a data connector 22 and a header information control connector 23. The data connector 22 receives record data. The header information control connector 23 receives a control command for controlling the data recorder 20 and header information corresponding to data supplied to the connector 22. The connectors 13 and 22 are connected to each other. The connectors 14 and 23 are connected to each other.

A tape cassette 30 accommodating the magnetic tape 1 is attached to the data recorder 20. In the following description, for simplicity, the tape cassette 30 that contains the magnetic tape 1 is referred to as magnetic tape 1. When data is recorded, the recording system 10 reads data from the data buffer 11 at a predetermined timing under the control of the CPU 12. The data that is read from the data buffer 11 is supplied to the data recorder 20 through the connectors 13 and 22. On the other hand, the header information corresponding to the data is generated by the CPU 12. The header information and the control command of the data recorder 20 are supplied to the data recorder 20 through the connectors 14 and 23. The header information is temporarily stored in an internal memory 21 of the recorder 20. The data recorder 20 is controlled corresponding to the supplied control command.

Figure 9:
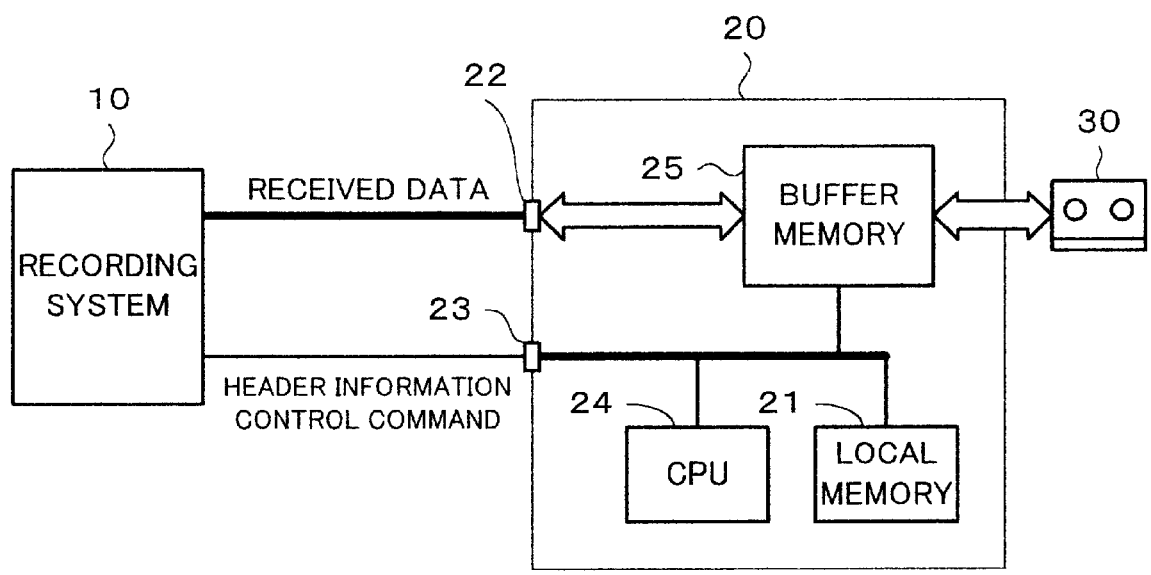
FIG. 9 is a block diagram showing an example of the structure of the data recorder according to the embodiment of the present invention.

FIG. 9 is a block diagram showing an example of the structure of the data recorder 20 according to the embodiment of the present invention. The data recorder 20 writes the above described header information to the additional information area 3 of the magnetic tape 1. In FIG. 9, for simplicity, similar portions to those in FIG. 8 are denoted by similar reference numerals and their description is omitted. In the data record 20, a CPU 24, a local memory 21, and a buffer memory 25 are connected to a bus 26.

All the operations of the data recorder 20 are controlled by the CPU 24. The operations of the data recorder 20 are controlled with commands generated corresponding to a program stored in a ROM (Read Only Memory) (not shown). The CPU 24 controls a drive mechanism (not shown) to drive the magnetic tape 1, the local memory 21 to access data, and the buffer memory 25 to access data. In addition, the CPU 24 controls the communication with the recording system 10 through a connector 23.

A control command is supplied from the connector 23 to the CPU 24. On the other hand, header to information supplied from the connector 23 is temporarily stored in the local memory 21.

The instrumental data supplied from the data connector 22 is temporarily stored in the buffer memory 25. When the amount of data stored in the buffer memory 25 exceeds a predetermined level, the data is swept out from the buffer memory 25. The data is recorded to an instrumental data area on the magnetic tape 1 by a tape driving and recording mechanism (not shown).

After the instrumental data has been recorded to the magnetic tape 1, the magnetic tape 1 is moved to the additional information area 3. The header information stored in the local memory 21 is recorded to the additional information area 3.

The data recorder 20 according to the present invention has the local memory 21 that stores header information generated by the CPU 12 of the recording system 10 and supplied along with a control command. After instrumental data has been recorded, header information is read from the local memory 21 and recorded to the additional information area 3 of the magnetic tape 1. Thus, the recording system 10 does not need to provide a switching mechanism for selecting instrumental data that is output from the data buffer 11 or header information that is output from the CPU 12.

Figure 10:
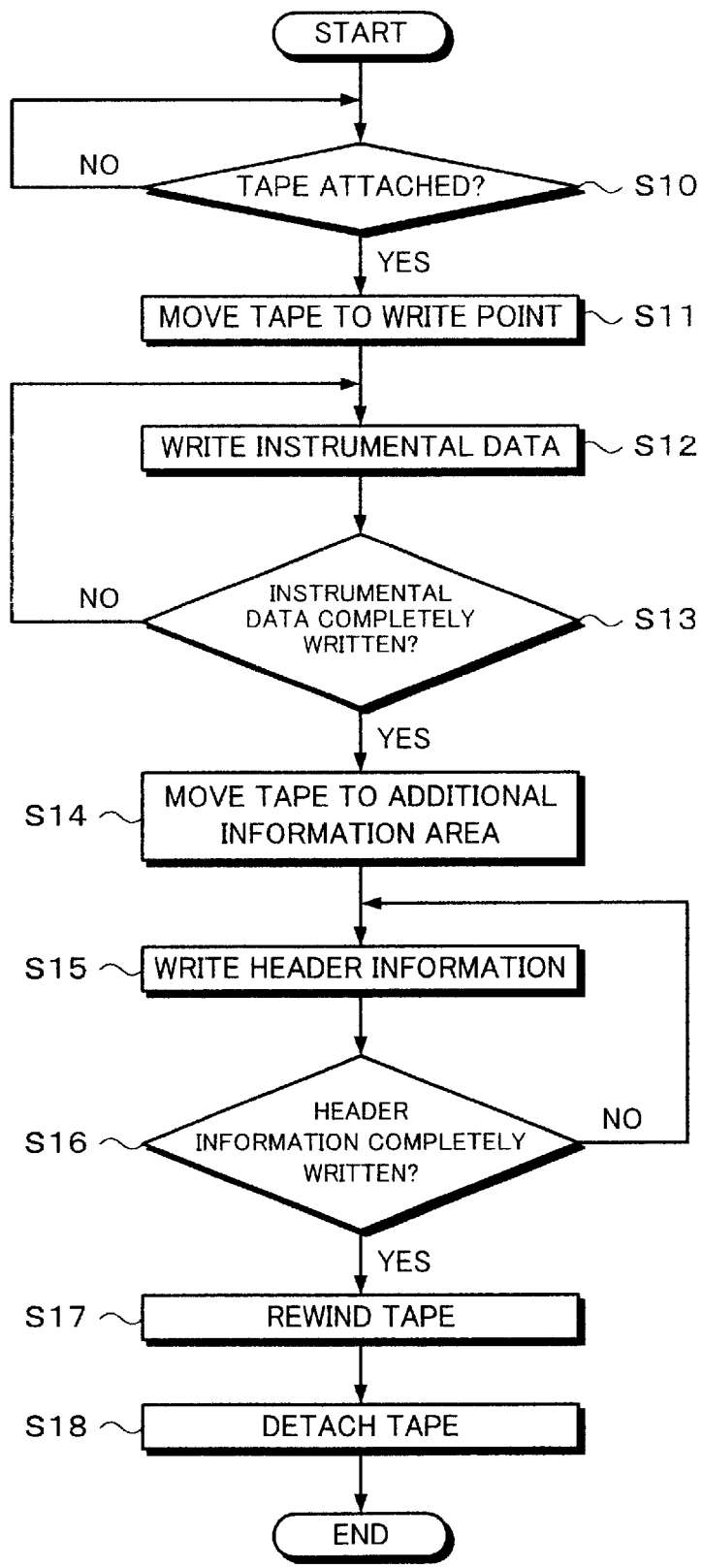
FIG. 10 is a flow chart showing an example of the process of the data recorder that records instrumental data according to the embodiment of the present invention.

FIG. 10 is a flow chart showing an example of the process of the data recorder 20 that records instrumental data. Before executing the process of the flow chart, the position A of the boundary 2 is set to the magnetic tape 1. For example, when a command "Format" is issued to the data recorder 20, the position A of the boundary 2 is set at a predetermined position of the magnetic tape 1 under the control of the CPU 24. The user can set the position A in a recordable area of the magnetic tape 1.

As with the command "Format", various commands are issued from the recording system 10 to the data recorder 20 through the connector 23. For example, when the user performs a particular operation to the computer of the recording system 10, the computer generates a command corresponding to the operation and outputs the command to the data recorder 20 through the connector 14. Alternatively, a command may be automatically generated and output corresponding to a particular program. Of course, the user can manually operate the data recorder 20 with the operation panel.

The magnetic tape 1 is attached to the data recorder 20 (at step S10). Data is read from the additional information area 3 of the magnetic tape 1 and stored to the local memory 21. When a command for writing data to the magnetic tape 1 is sent to the data recorder 20, the tape 1 is moved to a write point (at step S11). When the magnetic tape 1 is initially used, the write point is for example the position A. When data has been recorded on the magnetic tape 1, the write point is at the next address of the end of data in the instrumental data area 4.

Instrumental data to be recorded is input from the connector 22. In addition, a command "REC" for writing data is input from the connector 23. The instrumental data is temporarily stored to the buffer memory 25. The buffer memory 25 adjusts the record rate. When the amount of data stored in the buffer memory 25 exceeds a predetermined level, data is read from the buffer memory 25 and data is written from the write point of the magnetic tape 1 (at step S12).

In addition to the record data that is input from the connector 22, header information is input from the recording system 10 to the data recorder 20 through the connector 23. The header information is input with a control command of the data recorder 20. For example, header information is added as a parameter to a command for setting header information. The resultant command is sent from the recording system 10 to the data recorder 20. When the data recorder 20 receives the command, the header information added to the command is stored to the local memory 21.

After the data has been written (at step S13), the magnetic tape 1 is moved to the write point of the header information (at step S14). Thereafter, the header information stored in the local memory 21 is read and written to the magnetic tape 1 (at step S15). The magnetic tape 1 is manually moved by the user. Alternatively, the data recorder 20 may automatically move the magnetic tape 1 to the write point of the header information corresponding to the control command received from the recording system 10.

After the header information has been written (at step S16), the magnetic tape 1 is rewound (at step S17) and detached from the data recorder (at step S18).

Figure 11:
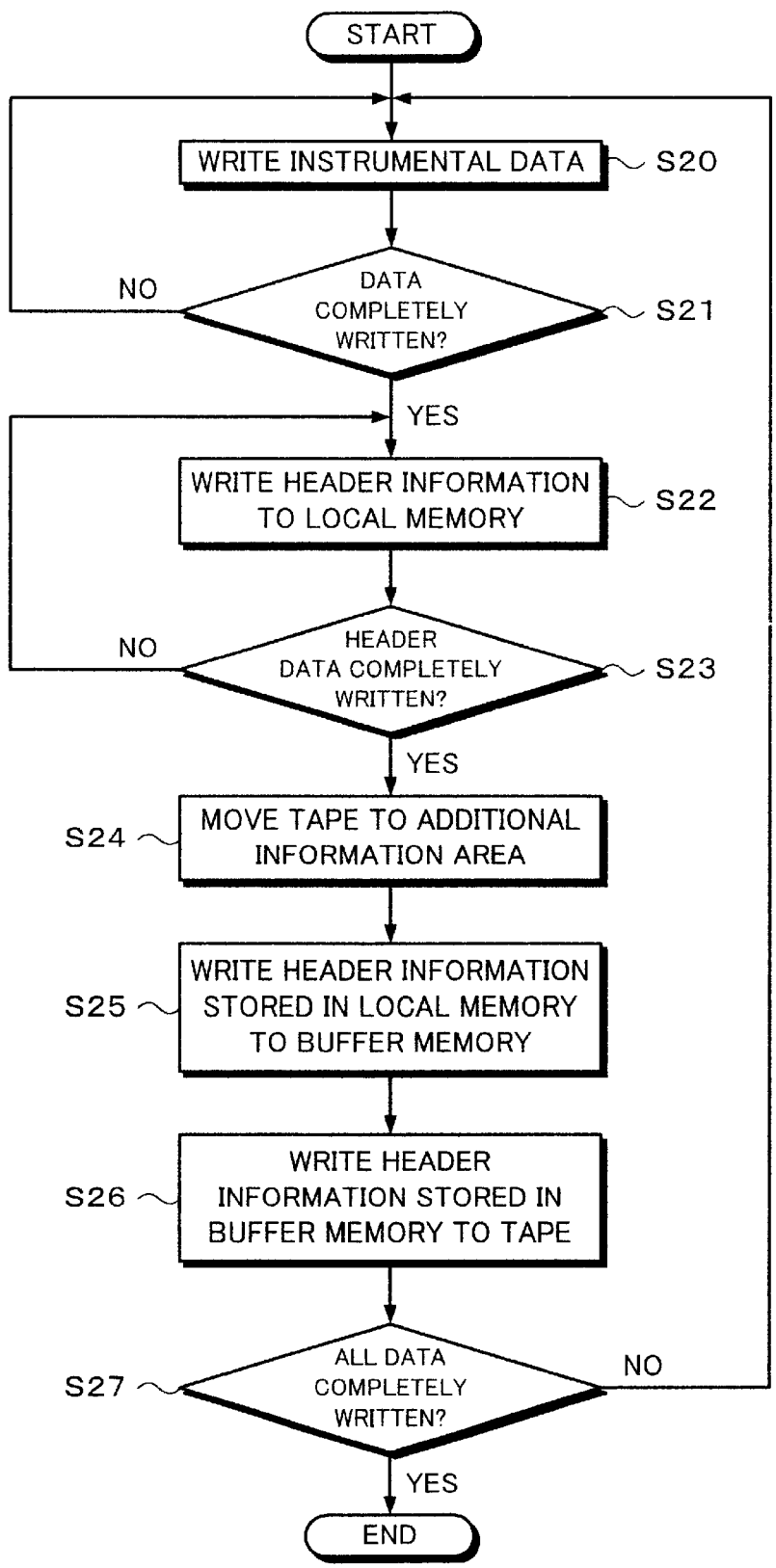
FIG. 11 is a flow chart showing the detail of the example of the process of the data recorder that records header information according to the embodiment of the present invention.

FIG. 11 is a flow chart showing an example of a process portion for header information of the flow chart shown in FIG. 10. The process shown in FIG. 11 is partly performed in parallel with the process shown in FIG. 15. In this example, it is assumed that the magnetic tape 1 has been attached, the data of the additional information area 3 has been read, and the magnetic tape 1 has been moved to the write point of the instrumental data.

When the amount of instrumental data supplied from the connector 22 and stored in the buffer memory 25 exceeds a predetermined level, the data is swept out from the buffer memory 25 and recorded to the magnetic tape 1 (at step S20). As described above, the instrumental data is recorded as helical tracks on the magnetic tape 1. The instrumental data is recorded on a track set of for example four tracks at a time. When data supplied from the connector 22 is stopped and the recording process is completed (at step S21), address information that represents the record position on the tape 1 (in this example, a track ID assigned for each track set) is supplied to the recording system 10 through the connector 23.

In the recording system 10, the CPU 12 generates header information corresponding to the address information supplied from the connector 14. In addition to a control command for writing header information, the header information is supplied from the recording system 10 to the data recorder 20 through the connectors 14 and 23 and then written to the local memory 21 (at step S22). After the header information has been written to the local memory 21 (at step S23), the magnetic tape 1 is moved to a header information write position (namely, at a predetermined position of the additional information area 3) by a driving mechanism (not shown) (at step S24).

The header information is composed of at least information that represents the record start position of the instrumental data recorded on the magnetic tape 1. This information is for example address information on the tape 1. Alternatively, the header information may be information that represents a data record end position. As another alternative method, the header information may contain another information defined by the user. For example, in a system that receives a radio wave from a satellite and measures data, the user can define the satellite name, the data and time of the received radio wave, and so forth. The defined information may be added to the header information. Alternatively, system data that is information of the system that measures and records data may be added as the header information. As another alternative method, index information of instrumental data recorded on the magnetic tape 1 may be recorded to the additional information area 3.

As described above, position information that represents the position A of the boundary 2 is recorded in the area B of the additional information area 3. In addition, the number of pieces of header information in the additional information area 3 is recorded in the area B. When the magnetic tape 1 is attached to the data recorder 20, the magnetic tape 1 is fast forwarded for a predetermined lead area. Thus, the data of the area B is read and the address information that represents the position A of the boundary 2 and the number of pieces of header information are obtained. Alternatively, the start address information of each piece of the header information may be written. At step S24, the header information write position can be obtained corresponding to the information of the area B.

When the tape 1 is moved to the header information write position, the flow advances to step S25. The header information is read from the local memory 21 and written to the buffer memory 25. Thereafter, the flow advances to step S26. At step S26, the header information is swept out from the buffer memory 25 and written to a predetermined position of the additional information area 3 of the magnetic tape 1.

After all the data is written, the process is completed (at step S27). When there is instrumental data to be recorded, the flow returns to step S20.

Figure 12:
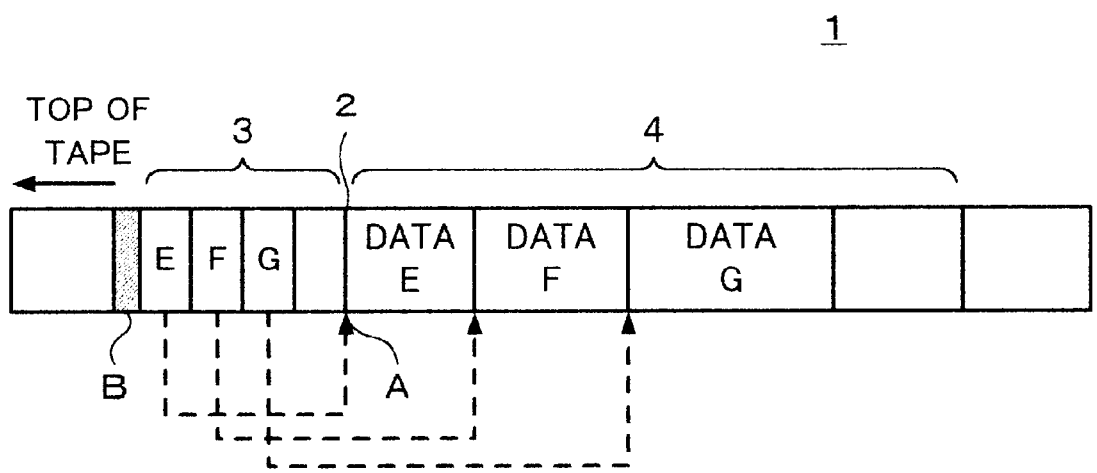
FIG. 12 is a schematic diagram showing an example of the format of the magnetic tape in which data has been recorded.

FIG. 12 is a schematic diagram showing an example of the format of the magnetic tape 1 on which data has been recorded in the above-described manner. In this example, it is assumed that three instrumental data pieces E, F, and G have been recorded on the magnetic tape 1 and that header information pieces E, F, and G corresponding to the instrumental data pieces E, F, and G have been recorded in the additional information area 3, respectively. The header information piece E contains information that represents the start position of the instrumental data piece E. Likewise, the header information pieces F and G contain information that represents the start positions of the instrumental data pieces F and G, respectively. When the data of the additional information area 3 is read, the start positions of the instrumental data pieces E, F, and G are obtained in succession.

Figure 13:
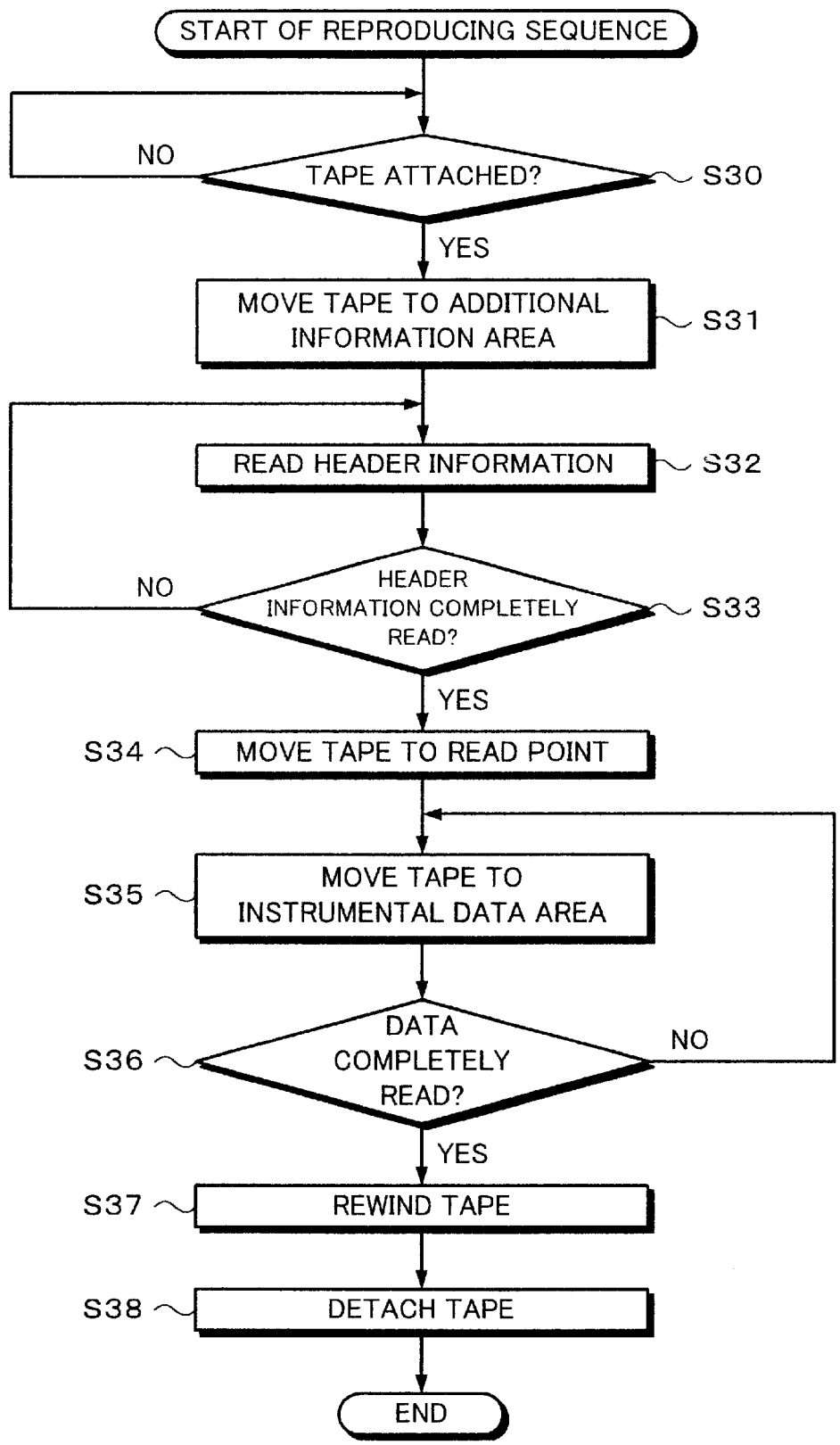
FIG. 13 is a flow chart showing an example of the process of the data recorder that reproduces instrumental data.

FIG. 13 is a flow chart showing an example of the process of the data recorder 20 that reproduces instrumental data. When the magnetic tape 1 is attached to the data recorder 20 (at step S30), the magnetic tape 1 is moved to the additional information area, 3 (at step S31). Thereafter, information that represents the position A of the boundary 2 is read from the area B at the top of the additional information area 3. Corresponding to information that represents the position A, data of the additional information area B is read (at step S32). In other words, all header information written in the additional information area 3 is obtained.

After the header information is read (at step S33), corresponding to address information represented by the header information, the magnetic tape 1 is moved to the read point of desired instrumental data (at step S34). At step S35, the desired instrumental data is read from the read point. After the desired instrumental data has been read, the tape 1 is rewound (at step S37) and detached from the data recorder 20.

Figure 14:
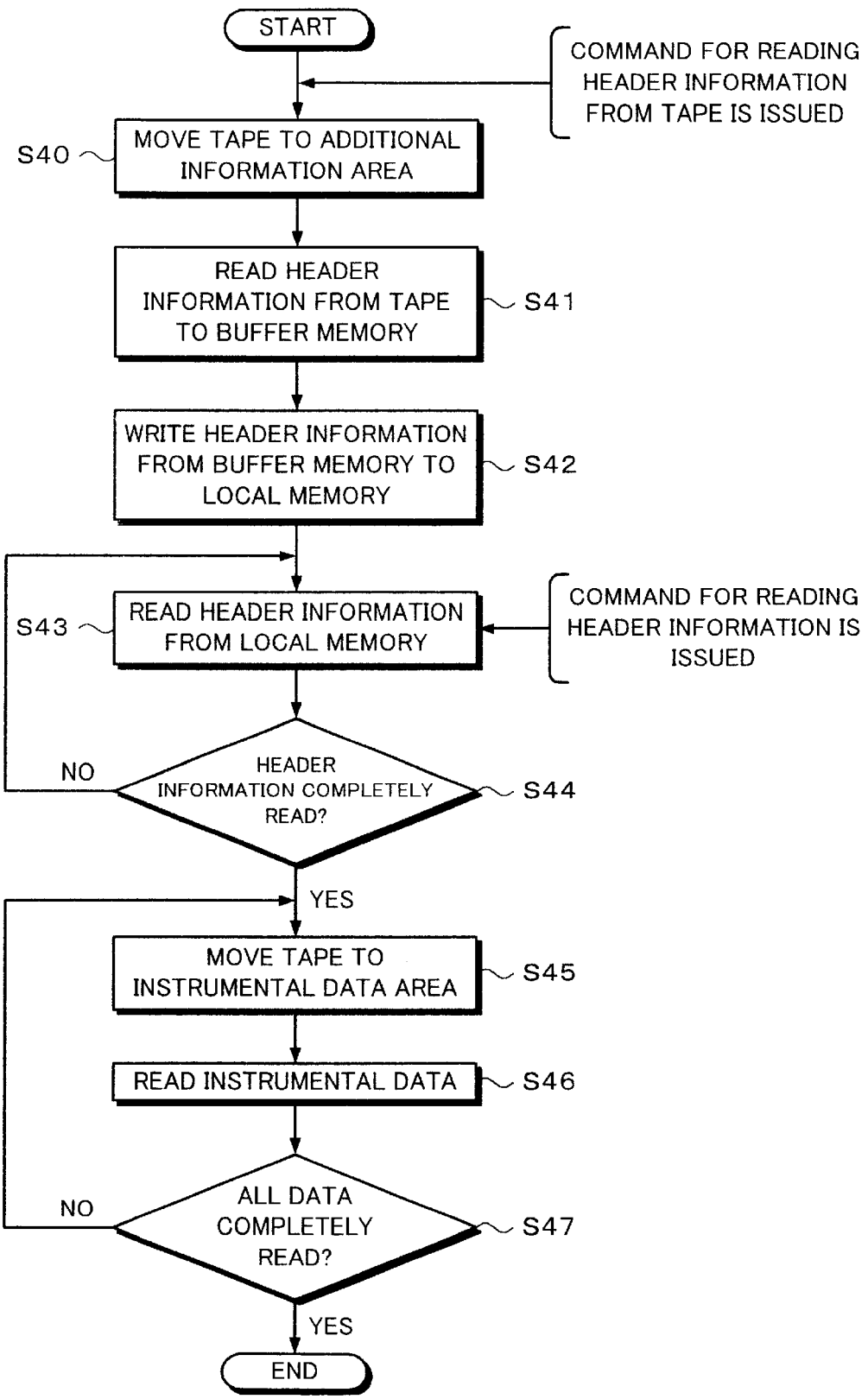
FIG. 14 is a flow chart showing the detail of the example of the process of the data recorder that reproduces header information.

FIG. 14 is a flow chart showing a process portion for header information in the flow chart shown in FIG. 13. In this example, it is assumed that the magnetic tape 1 has been attached to the data recorder 20. A command for reading header information from the tape 1 is issued from the recording system 10 to the data recorder 20. Corresponding to the command, the tape 1 is moved to the top of the additional information area 3 (at step S40).

At step S41, data is read from the additional information area 3 of the tape 1 by the data recorder 20. The read data is written to the buffer memory 25. For example, information that represents the number of pieces of header information recorded in the additional information area 3 and header information is read from the additional information area 3 of the tape 1 and written to the buffer memory 25. At step S42, these pieces of the data are read from the buffer memory 25 and written to the local memory 21.

In such a manner, all the data of the additional information area 3 of the tape 1 is written to the local memory 21. When a command for reading header information is issued from the recording system 10 to the data recorder 20, header information is read from the local memory 21 under the control of the CPU 24 and supplied to the recording system 10 through the connectors 23 and 14 (at step S43). The header information is supplied to the CPU 12 of the recording system 10.

After the header information has been read from the local memory 21 (at step S44), the recording system 10 selects the read point of a desired instrumental data piece corresponding to the supplied header information.

For example, when the data recorder 20 records instrumental data to the tape 1, the recording system 10 correlates an instrumental data piece with a relevant header information piece. The user can select a header information piece of the write point of the desired instrumental data piece.

At step S45, the recording system 10 issues a command for reading instrumental data to the data recorder 20. This command is supplied to the data recorder 20 through the connectors 14 and 23. The data recorder 20 moves the tape 1 to the designated position corresponding to the command (at step S45). The data recorder 20 reads instrumental data from the moved tape position corresponding to the command (at step S46). After the data recorder 20 has read the desired data, the data recorder 20 completes the process (at step S47).

As described above, according to the present invention, the magnetic tape 1 is attached to the data recorder 20. First of all, data is read from the additional information area 3. Thus, header information corresponding to the instrumental data recorded on the magnetic tape 1 is obtained. Thus, the user can obtain all contents of the magnetic tape 1. For example, the user can quickly access a desired data piece when data is reproduced.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An information recording apparatus for recording a sequence of user data composed of a digital signal to a tape record medium, comprising:

boundary setting means for setting the boundary of a first area and a second area to the tape record medium, the first area being used to record the user data, the second area being used to record header information containing at least position information that represents the tape position of the beginning portion of the user data;

first memory means for successively storing the user data in the order of which the user data is received;

second memory means for storing the header information formed corresponding to the user data;

recording means for reading the user data from said first memory means corresponding to a control signal, recording the user data to the first area, reading the header information from said second memory means, and recording the header data to the second area in the order of which the user data is racorded to the first area; and controlling means for generating the control signal.

2. The information recording apparatus as set forth in claim 1, wherein said controlling means controls said recording means so as to record the position information of the boundary of the first area and the second area to the top portion of the second area.

3. The information recording apparatus as set forth in claim 1, wherein said controlling means controls said recording means so as to read the header information from said second memory means, temporarily write the header information to said first memory means, read the header information from said first memory means, and record the header information to the second area.

4. The information recording apparatus as set forth in claim 1, wherein said controlling means records the user data to the first area and then the header information to the second area.

5. The information recording apparatus as set forth in claim 1, wherein the header information further contains time information of the user data.

6. The information recording apparatus as set forth in claim 1, wherein the header information further contains identification information of the user data.

7. The information recording apparatus as set forth in claim 1, wherein the position information is address information that represents the position in the longitudinal direction of the tape record medium.

8. The information recording apparatus as set forth in claim 1, wherein the user data is composed of instrumental data that is measured or observed in a time sequence.

9. The information recording apparatus as set forth in claim 1, wherein said recording means records the first and second areas as respective first and second non-interleaved main areas in the tape length direction.

10. The information recording apparatus as set forth in claim 9, wherein said second area immediately follows a top of tape area of the tape record medium, said first area immediately follows said second area, and an end of tape area follows said first area.

11. An information recording method for recording a sequence of user data composed of a digital signal to a tape record medium, comprising the steps of:

(a) setting the boundary of a first area and a second area to the tape record medium, the first area being used to record the user data, the second area being used to record header information containing at least position information that represents the tape position of the beginning portion of the user data;

(b) successively storing the user data in the order of which the user data is received;

(c) storing the header information formed corresponding to the user data;

(d) generating a control signal to control data reading; and (e) reading the user data obtained at step (b) corresponding to the control signal, recording the user data to the first area, reading the header information obtained at step (c), and recording the header data to the second area in the order of which the user data is recorded to the first area.

12. The information recording method of claim 11, wherein said first and second areas are recorded as respective first and second non-interleaved main areas in the tape length direction.

13. The information recording method of claim 12, wherein said second area immediately follows a top of tape area of the tape record medium, said first area immediately follows said second area, and an end of tape area follows said first area.

* * * * *